United States Patent [19]

Alm

[11] Patent Number: 5,640,096
[45] Date of Patent: Jun. 17, 1997

[54] ELASTOMER LEAK DETECTION APPARATUS

[75] Inventor: Christian Alm, Wallingford, Conn.

[73] Assignee: Anderson Manufacturing Co., St. Paul, Minn.

[21] Appl. No.: 555,083

[22] Filed: Nov. 8, 1995

[51] Int. Cl.$^6$ .................................................. G01M 3/16
[52] U.S. Cl. .......................... 324/559; 324/718; 324/557; 340/605; 73/40
[58] Field of Search .............................. 73/40; 340/605; 324/559, 557, 718

[56] References Cited

U.S. PATENT DOCUMENTS

| | | | |
|---|---|---|---|
| 4,719,407 | 1/1988 | Converse | 324/559 |
| 4,725,785 | 2/1988 | Converse | 324/559 |
| 4,740,757 | 4/1988 | Converse | 324/559 |
| 5,081,422 | 1/1992 | Shih | 73/40 |
| 5,184,083 | 2/1993 | Groover | 324/559 |
| 5,540,085 | 7/1996 | Sakata | 73/40 |

FOREIGN PATENT DOCUMENTS

WO87/03987  7/1987  WIPO .................... 324/559

Primary Examiner—Kenneth A. Wieder
Assistant Examiner—Jose M. Solis
Attorney, Agent, or Firm—D. L. Tschida

[57] ABSTRACT

Portable apparatus for inducing an alternating electrical gradient into an impounded liquid media and including, directionally sensitive, sensing apparatus for monitoring gradients established in the liquid to detect leaks at a liquid impermeable membrane. A conductive electrode floated on the liquid directs an amplified square wave signal into the liquid at a 5 to 15 hertz frequency relative to a ground reference established outside the membrane. First and second recessed sensors in a portable, hollow tubular probe are manipulated within the liquid. A portable signal processor monitors a changing signal between the sensors as the probe is moved in the liquid. The sensed and source signals are synchronously sampled, integrated, subtracted in a positive correlation arrangement, and amplified to reject common mode signals within the liquid. The resultant signal is coupled to a voltage controlled oscillator and headset, which produces an audible annunciation indicative of the leak location, and which signal is directionally sensitive to probe position relative to the leak. Self-supporting, cover assemblies isolate electrical accessories, such as lights, appended to the membrane. A flexible probe for locating leaks in supply and return conduits is also disclosed.

18 Claims, 11 Drawing Sheets

ELASTOMER LEAK DETECTION APPARATUS

BACKGROUND OF THE INVENTION

The present invention relates to monitoring equipment for geomembranes and, in particular, to a system for monitoring leaks at elastomer swimming pool liners.

Pin hole leaks at large liquid impoundment membranes, such as a swimming pool liner, can result in large volumes of lost water. For example, leaks may occur from defects in the material, punctures or cracks that develop with age or exposure to ultraviolet light or normal use. In contrast to broken plumbing fittings or conduits, the leaks can occur anywhere in the surface of the membrane and are extremely difficult to locate. That is, the leak size is not typically susceptible to visual observation. Water clarity, light diffraction, and patterns formed in the liner also frequently hinder direct viewing for leaks.

For a swimming pool, depending upon the numbers and the locations of the leaks and the pressure of the liquid, the loss of liquid can be large, for example, on the order of 500 to 1000 m gallons per day or more. Additional liquid must be frequently added to compensate for the losses and the chemicals must be re-balanced. Over time, the operating costs to maintain the pool can increase. For impoundments of hazardous liquids, groundwater affecting leakages can be especially costly.

A variety of methods and equipment have been developed to address comparable problems for a variety of applications. U.S. Pat. No. 4,309,576 discloses a portable acoustic detection system for use with an impounded liquid. U.S. Pat. No. 4,905,210 discloses the use of a hydrophone array. U.S. Pat. No. 4,357,113 discloses a system which uses an array of thermal sensors.

Various systems which induce DC voltage gradients into the impoundment are also known. U.S. Pat. No. 4,720,669 monitors the changing current density at a hemispherical probe and a portion of the liquid trapped beneath the probe. U.S. Pat. No. 4,751,467 measures current changes through a skirt and a second liquid contained between the skirt and impoundment membrane. U.S. Pat. No. 4,740,757 measures magnetic field changes through a second liner and a contained liquid between the first and second liners. U.S. Pat. Nos. 4,719,407 and 4,725,785 measure changing voltage gradients in the impounded liquid with an RF controlled probe and a radially rotated probe. PCT application WO 87/03987 discloses a system which measures gradient changes with a portable differential probe.

U.S. Pat. No. 4,565,965 provides a pulse amplitude measurement system for monitoring leaking roof liners.

In contrast to known systems, the present invention provides a portable monitoring system having a directionally sensitive probe. A low frequency AC (e.g. 5–15 Hz full square wave) signal is impressed into the liquid and a portable, pole mounted probe monitors current gradients established in the liquid to provide a highly accurate indication of a leak location.

SUMMARY OF THE INVENTION

It is a primary object of the invention to provide apparatus for detecting leaks in a membrane which impounds a liquid.

It is a further object of the invention to provide detection apparatus which couples an alternating electrical source signal to the liquid during monitoring and which removes noise and common mode signals from the sensed signals obtained upon manipulating a probe about the liquid.

It is a further object of the invention to provide apparatus which correlates the sensed signals to the source signal and whereby a directionally sensitive signal is obtained which indicates relative movement to a leak location.

It is a further object of the invention to provide portable monitoring equipment mounted to a pole which can be directed about the liquid and wherein the sensed signals are converted to an audible signal heard by a probe operator.

It is a further object of the invention to provide a cover assembly for insulating electrical appliances exposed to the liquid, such as by creating an airspace between the appliance and liquid.

It is a further object of the invention to provide a probe which is mounted to a flexible guide which can be inserted and manipulated about a liquid conduit to locate normally inaccessible leaks.

Various of the foregoing objects, advantages and distinctions of the invention are obtained in a portable system comprised of a stationary signal generator and a portable operator manipulated probe which couples sensed signals to a processor supported at the operator. The generator couples an amplified square wave current at 5 to 15 Hertz into the liquid via a floating anode and a ground rod positioned adjacent the membrane. A pole mounted probe contains a pair of displaced electrodes which produce a voltage indicative of changing current gradients as the probe is manipulated about the liquid.

The processor monitors and amplifies detected voltage signals from the probe. The sensed signals are synchronously sampled via a solid state switch, integrated, and compared to the separately sampled source signal at an operational amplifier, where the sampled signals are subtracted before being amplified and coupled to a voltage controlled oscillator. A resultant leak sensitive frequency is coupled to earphones or a speaker carried by the operator.

Noise and common mode signals are filtered from the sensed signals as the sensed signals are correlated to the source signal, which improves the leak sensitivity of the processor. The correlation of the sensed and source signals to one another also enhances positional sensitivity through a notable frequency rolloff or null condition which occurs when monitoring an open pool. When monitoring pipes the equivalent polarity reversal or negative correlation which occurs upon passing a leak produces a null condition indicative of the leak location.

Self-supporting covers, which are coupled to a pump via tubular conduits, can be mounted over electrical accessories mounted to the membrane to further alleviate extraneous noise. The covers enable the development of an air insulator to isolate the accessories from the monitoring circuitry. A variety of other dielectric or insulative covers may be used to a similar end.

Still other objects, advantages and distinctions of the invention are more apparent from the following detailed description with respect to the appended drawings. To the extent various modifications and improvements have been considered, they are described as appropriate. The description should not be literally construed in limitation of the invention which rather should be broadly construed in view of the further appended claims.

DESCRIPTION OF THE PREFERRED EMBODIMENT

Figure 1:
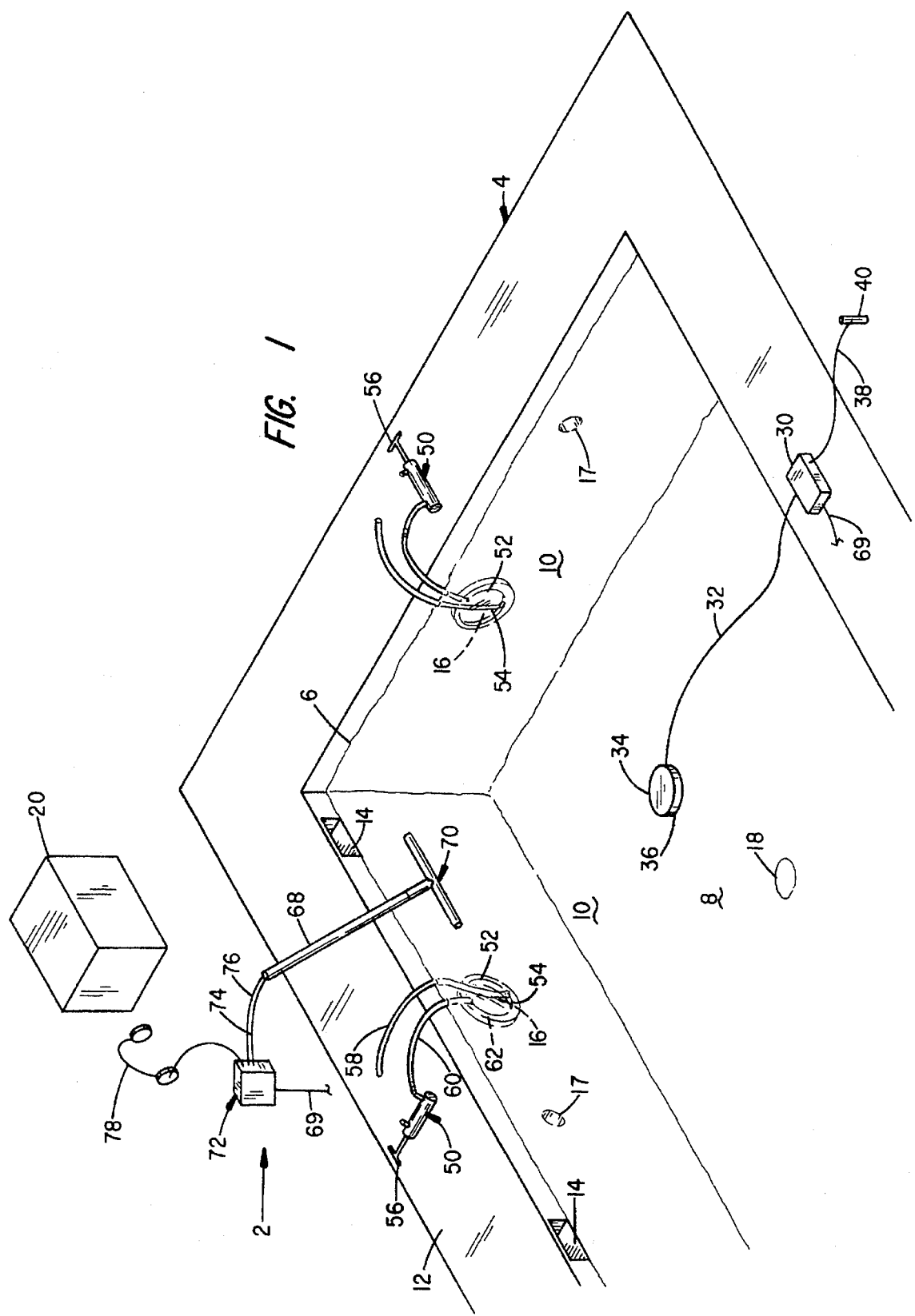
FIG. 1 is a general system assembly drawing of a typical swimming pool as it is monitored for leaks with the present equipment.
Figure 2:
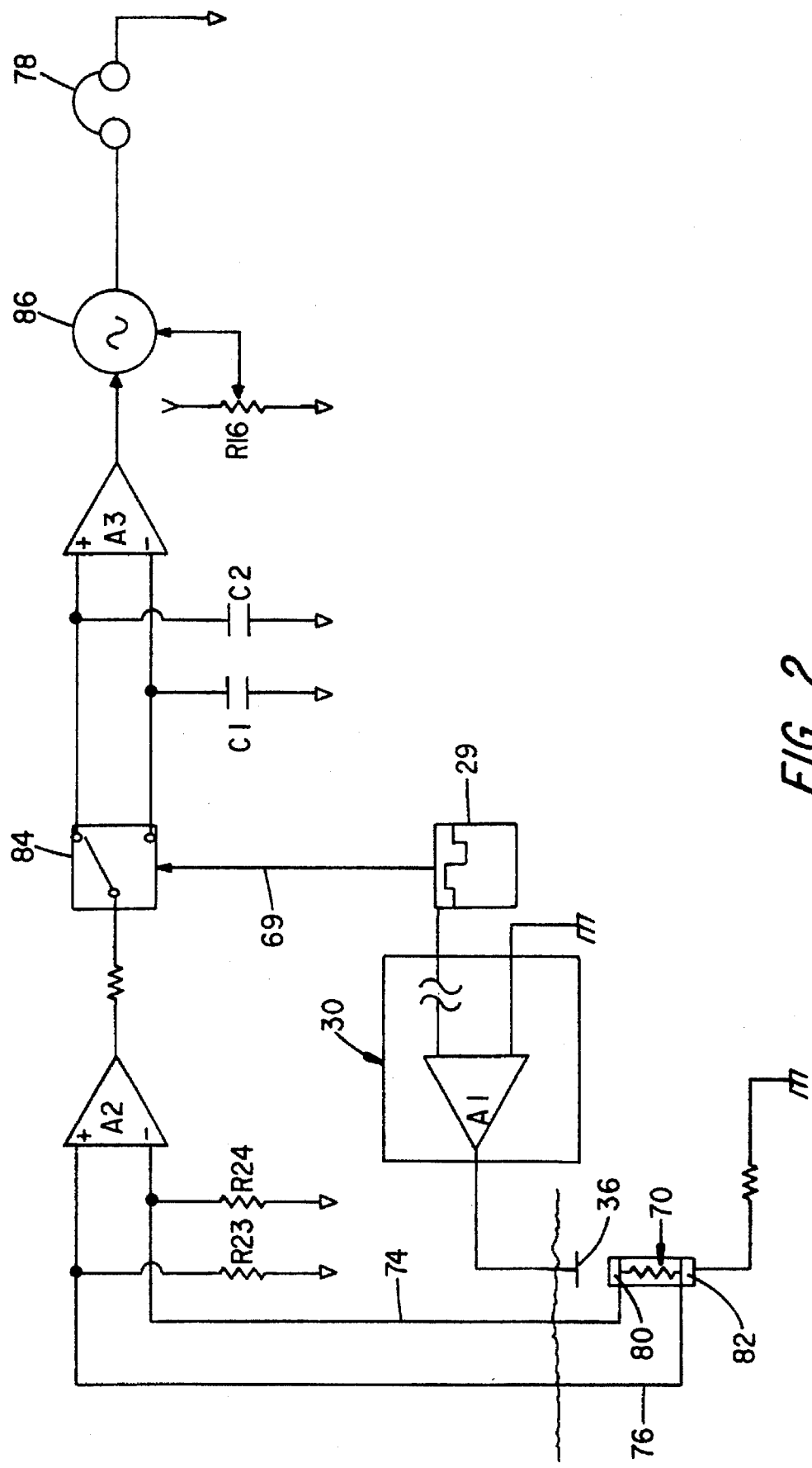
FIG. 2 is a block diagram of the system's electronics.

Referring to FIG. 1, a conceptual diagram is shown to the principal physical components of the monitoring system 2 in relation to a typical swimming pool 4. FIG. 2 shows a general schematic block diagram to the electrical circuitry of the system 2. The pool 4 generally provides an elastomer membrane 6 which is fitted to a hole that is dug into the ground. The membrane 6 is fitted to the contours of the hole to provide a bottom 8 and sidewalls 10. The membrane 6 is trained over the top edges of the hole in conventional fashion and an appropriate apron or walkway 12 is formed about the pool 4, which also retains the membrane 6 to the hole.

Fitted to the walls of the membrane 6 are necessary skimmers 14, lights 16, supply outlets 17, and a center drain 18. Associated supply and return plumbing conduits (not shown) extend from the outlets 17, skimmers 14 and drain 18 to an adjacent equipment pad or "pool house" 20. The house 20 provides an enclosed area protected from the weather and swimmers, and contains associated pumps, filters, chlorine dispensers, monitoring and sundry operating and/or maintenance equipment. Related electrical controls are typically also provided at the house 20 for the pumps and lights 16. The particular configuration and accessories provided with any pool 4 will vary depending upon building code requirements and user preferences.

A problem indigenous to outdoor pools is leakage which can occur at the membrane 6. Other commonly encountered leaks occur at the supply and return plumbing conduits that extend between the skimmers 14, outlets 17, drain 18 and pool house 20. The latter leaks are localized to the piping paths established during the installation of the pool 4, but which paths frequently are not accurately documented. Leaks are frequently first indicated through visual observation with the loss of a large volume of water between water treatments of the pool.

Unless a puncture, broken line or fitting separation is visually apparent, a leak may be difficult to locate. Leaks at the buried piping or membrane 6 can be insidious and produce large liquid losses. Leaks at the membrane 6, although available for visual inspection, can occur at relatively minute perforations at the membrane 6. Tears and physical abrasions may be visibly apparent. However, "pin hole" perforations are not readily visible, yet with the typical pressures developed within a conventional pool can produce high volume liquid loss over time. Numbers of such perforations can exaggerate liquid loss.

Leaks of the latter type are particularly detected with the portable monitoring equipment 2 of the invention. With additional attention to FIG. 2, the assembly 2 can be transported about the perimeter of the pool 4 to locate one or more leaks at the membrane 6. The assembly 2 includes a battery powered, AC signal generator or booster 30, reference also FIG. 3, which is supported along the edge of the pool 4. A conductor 32 extends from a jack J1 at the booster 30 and mounts to a floating support 34. The support 34 supports a brass anode 36 that is submersed in the liquid.

A separate conductor 38 extends from the booster 30 to a ground rod 40 which is driven into the ground in close proximity to the membrane 6. Although a single ground rod 40 is shown, an array of ground rods 40 might be spaced about the perimeter of the pool 4 and be electrically coupled to one another and the equipment 2 to provide a desired ground or return path for the signals generated at the booster 30 and the gradients established in the liquid between the anode 36 and ground 40.

Figure 3:
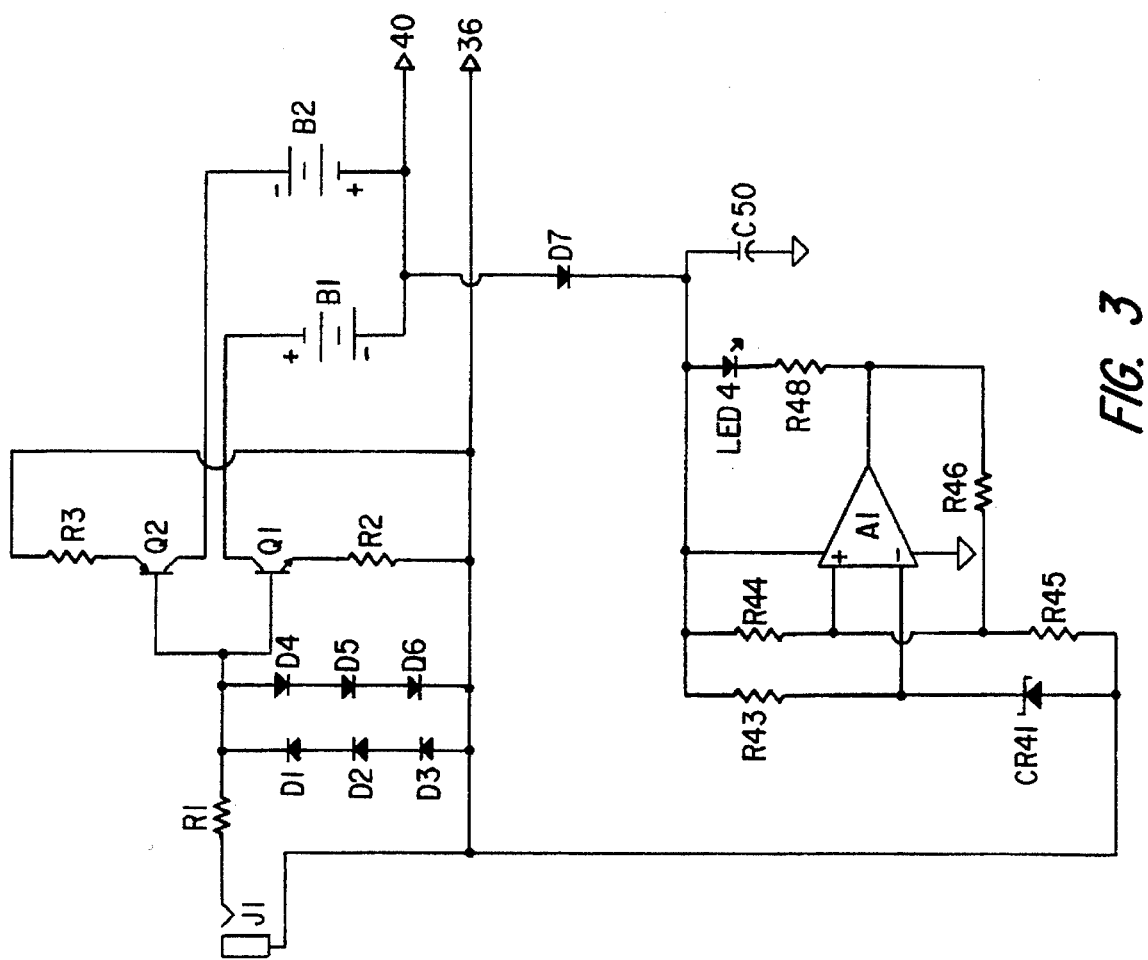
FIG. 3 is a schematic diagram to the signal generator or current booster circuitry which induces a gradient in the liquid.
Figure 4:
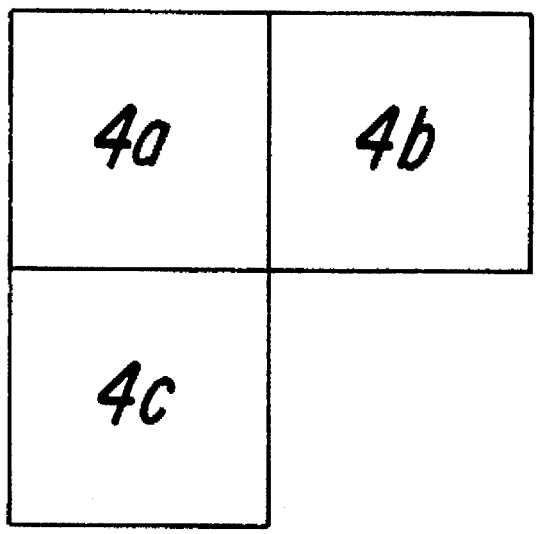
FIG. 4 and FIGS. 4a, 4b and 4c show a schematic diagram of the portable signal processing circuitry which monitors the output of a manipulated probe.
Figure 5:
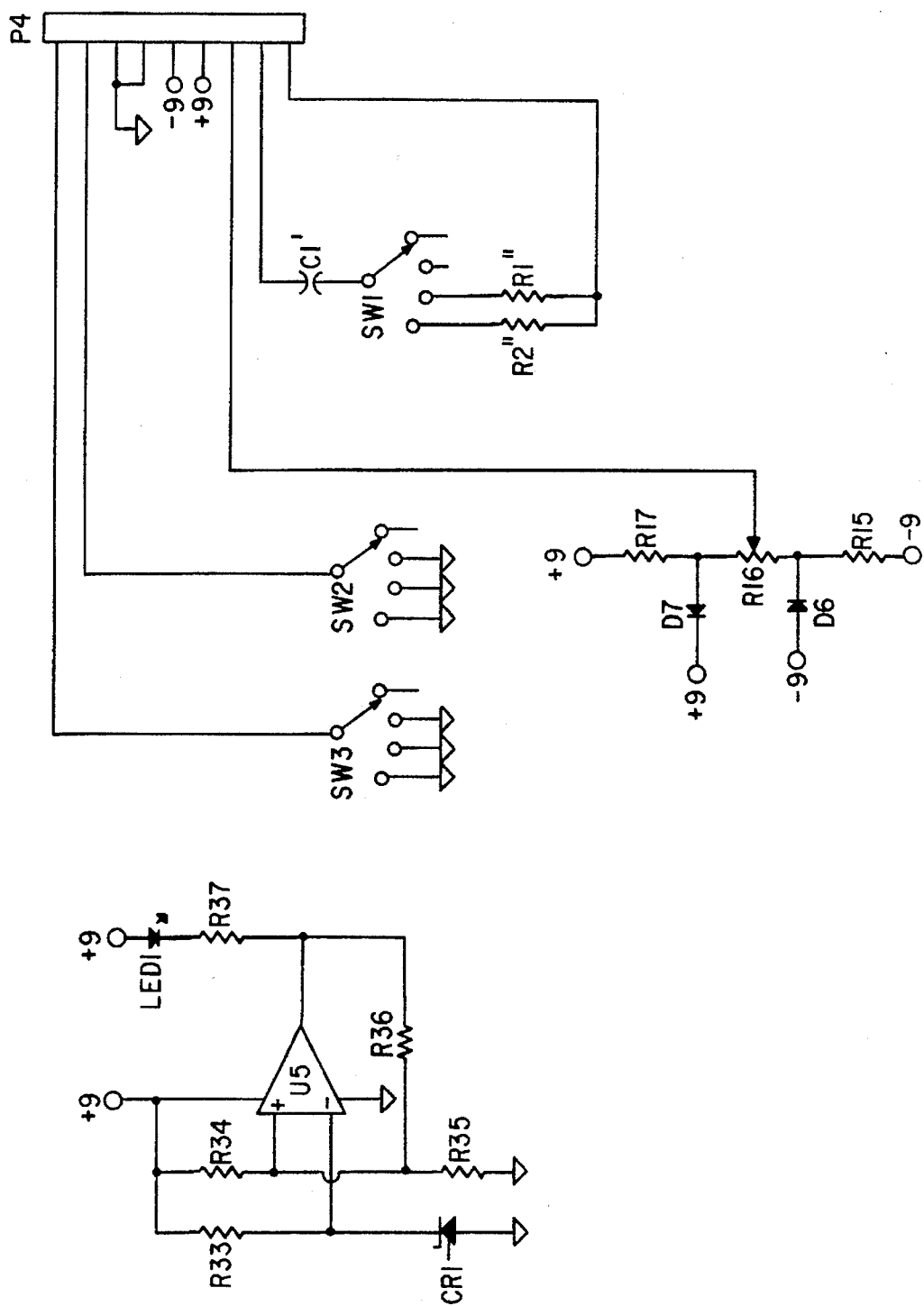
FIG. 5 is a schematic diagram of the operator controls at the portable signal processing circuitry of FIGS. 4 and 4a to 4c.

FIG. 3 depicts a schematic diagram to the circuitry of the signal generator or booster 30. The booster 30 includes a square wave generator 29 and an amplifier A1, which are constructed from the amplifiers U1 and U2 at FIG. 3, and which produce and amplified, full square wave signal from a typical logic voltage level of 6 to 9 volts available at a pair of batteries B1, B2 to a voltage of approximately 12 volts. The voltage is switched at a frequency in the range of 5 to 15 Hertz. The higher voltage improves the dynamic range of the system 2. A longer time is required to charge the dielectric pool liner 6, that is the pool and the membrane 6 effectively act as a capacitor. The increased range also allows the location of smaller leaks. Approximately 250 milliamps of alternating current is induced into the liquid. The values of the circuit components of the generator 30 and processor 72 shown at FIGS. 3–5 are set out at Table I below.

TABLE I

| | |
|---|---|
| R2, R3 | 10 ohm |
| R1, R10, R12, R15, R17, R18, R27–R30 | 10K ohm |
| R1', R1", R2"R4, R11, R19–R22, R25, R26 | 100K ohm |
| R7 | 100 ohm |
| R32 | 4K ohm |
| R33, R43, R44 | 12K ohm |
| R35, R48 | 18K ohm |
| R45, R34 | 36K ohm |
| R31 | 44K ohm |
| R3, R13 | 75K ohm |
| R5, R14 | 301K ohm |
| R2', R6, R8, R9, R46, R16, R36 | 1M ohm |
| R37, R47 | 1.5M ohm |
| R23, R24 | 10M ohm |
| C1–C8, C11, C12, C14–C19 | .1 uf |
| C50 | 330 uf |
| Q1 | TIP41 |
| Q2 | TIP42 |
| Q3, Q4 | 2N5484 |
| U1, U2 | LM324 |
| U1, U2 | LM324 |
| A1 | LM393D |
| U4 | TL084 |
| U5 | LM393 |
| CR1, CR41 | LM336-2.5 |
| D1–6(FIG. 3), D1–D11(FIGS. 4a–4c) | 1N4148 |

Figure 6:
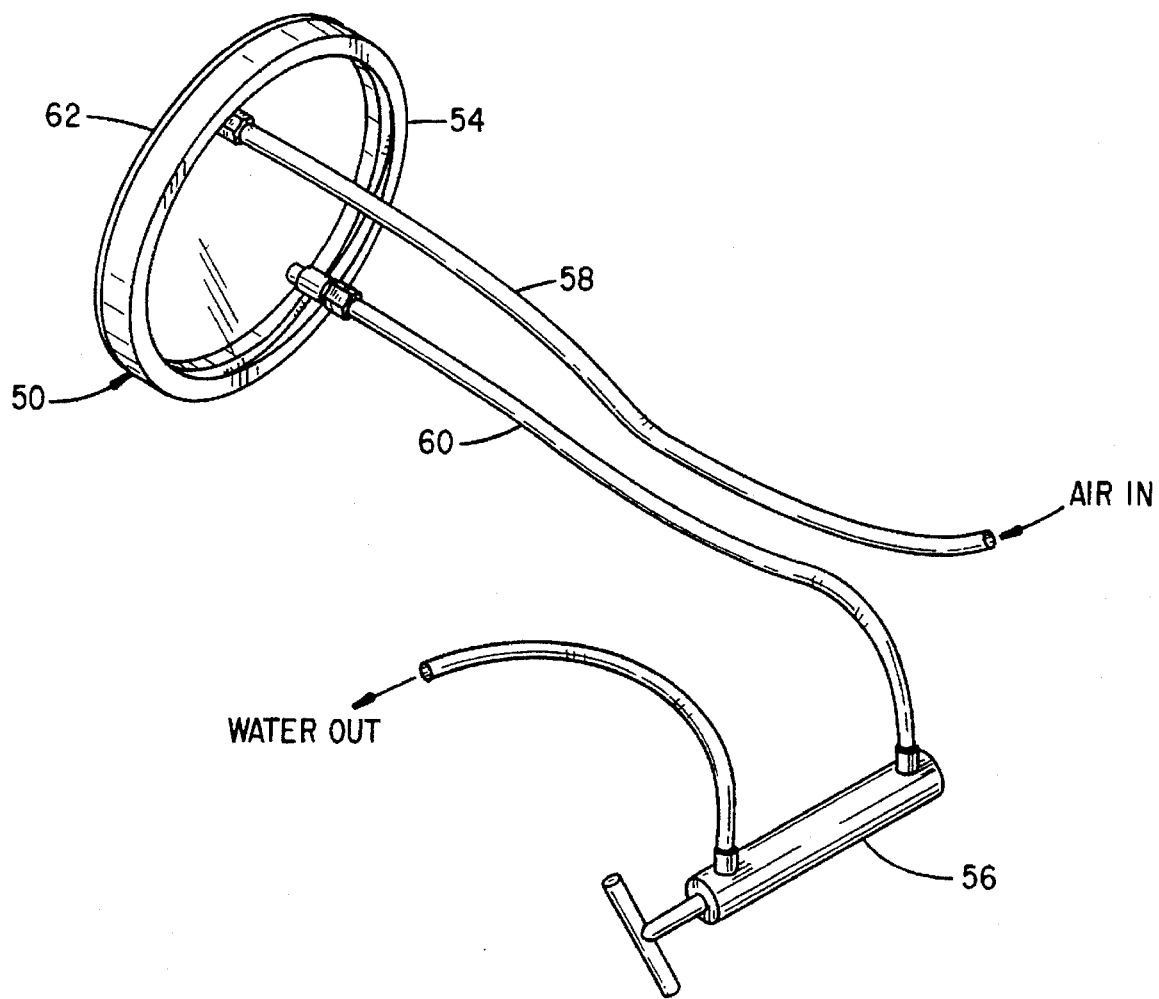
FIG. 6 is an exploded assembly drawing to the evacuated covers used to isolate the lights and other active sources of electrical signals at the membrane liner.

Supported to each of the lights 16 is a cover assembly 50, which is shown in greater detail at FIG. 6. The cover assemblies 50 isolate and electrically insulate any spurious electrical signals or noise at the lights 16 from the liquid. That is, an air space is created between the lens 52 at each light 16 upon the evacuation of the space beneath a sealed, transparent cover 54 with the aid of a hand pump 56 to evacuate water from the space. Conduits 58 and 60 extend from the pump to the cover 54. An elastomer seal 62 at the back of each cover 54 assures a water tight seal between the membrane 6 and the cover 54.

Although one presently preferred cover 54 is shown, covers constructed from a variety of dielectric and insulative materials may be fitted to seal off the lights 16 or other electrical fixtures. Such covers can be configured without the necessity of creating an airspace. Cover assemblies 50 are not generally required at the skimmers 14, outlets 17 or drain 20, since they merely serve as liquid ports and are electrically inert relative to the system. If the skimmers 14 or drain 18 are the suspected sources of liquid leakage, they can be monitored with a probe 90 that is secured to a flexible guide 92 and which probe is shown and discussed below with respect to FIG. 8. The probe 90 is preferred for locating internal leaks since screws and other anchors at the accessories can affect the sensitivity and ability of the system 2 to detect leaks.

Figure 7:
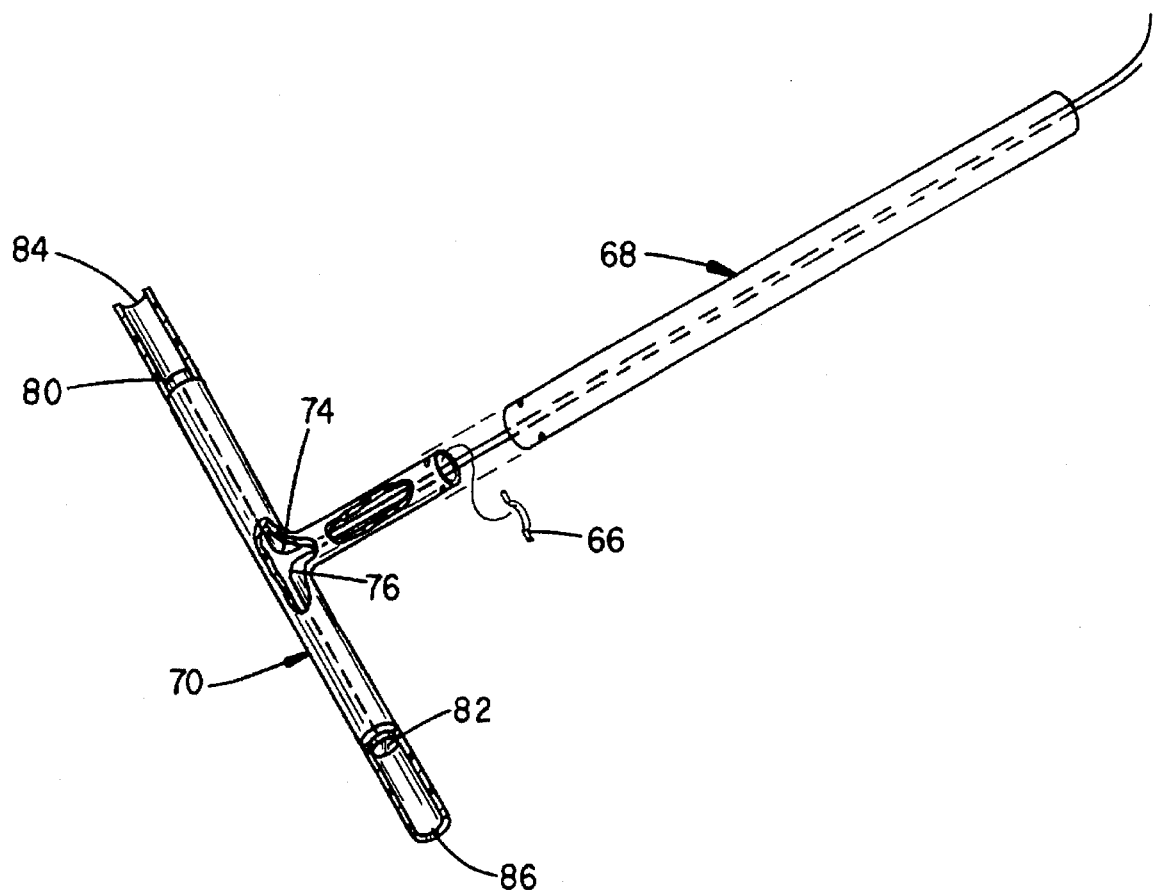
FIG. 7 is a perspective drawing shown in partial cutaway to the pole mounted probe and internal electrodes.

In most instances the membrane is initially monitored with the aid of a pole 68 and to which a probe 70 is fitted via a spring clip 66. The resulting portable, T-shaped assembly and probe 70 are directed about the liquid by pool maintenance or operator personnel. A portable signal processor 72, reference FIGS. 4, 4a to 4c and 5, is carried by the operator and electrically coupled via conductors 74, 76 and jacks J2 and J3 to the probe 70. Position dependent signals, due to the resistance of the liquid and differing current gradients in the liquid, are monitored at a pair of displaced electrodes or sensors 80, 82 contained within hollow ends 84, 86 of the probe 70, reference FIG. 7. The electrodes 80, 82 presently consist of a pair of brass or stainless steel contacts, which are soldered to the conductors 74, 76, and which are separated approximately five inches.

The electrodes 80, 82 are recessed at the ends 84, 86 a sufficient distance, on the order of 2 to 3 inches, to prevent turbulence with movement of the probe 70 from affecting the sensed signals. The detected signals are conveyed via the conductors 74, 76, which extend through the probe 70, to the processor 72. A headset 78 which is worn my the operator provides an audible annunciation indicative of the location of a leak. An audio speaker may be substituted for the headset 78 or alternatively a variety of other visual or audible indicators can be used if coupled via appropriate interface circuitry to the processor 72.

The operation of the detector or processor circuitry 72 is to monitor a directional signal obtained from the manipulation of the probe 70 about the liquid. The processor circuitry is shown generally at FIG. 2 and in detail at FIGS. 4, 4a to 4c, and 5.

As the probe 70 is directed through the liquid, an increased current and voltage between the sensors 80, 82 is sensed as the probe 70 approaches a leak. The current gradient to the leak being the largest. The current and voltage are sensed across the substantially fixed resistance of the water between the probe electrodes 80, 82. The voltage is sensed at an operational amplifier A2, constructed from the amplifiers U4 and FIG. 4c, and coupled to a solid state switch 84, constructed from transistors Q3 and Q4 at FIG. 4b, which is coupled to the square wave source signal of the booster 30.

The switch 84 acts like a single pole double throw switch and operates in synchrony with the full square wave signal produced by the generator 30 to sample the sensed voltages at the amplifier A2. A pair of capacitors C5 and C6 integrate the sensed leak indicating voltage in relation to the synchronously sampled source signal to effectively filter the sensed voltage of all common mode signals, such as battery drift, 60 hertz line frequencies, noise and other stray signals present in the liquid. A second operational amplifier A3, constructed from the amplifier U3, compares the integrated signals and amplifies the resultant difference. The voltage signal appearing at the output of the amplifier A3 is thus representative only of the sensed current gradient induced into the liquid by the generator 30.

Figure 4A:
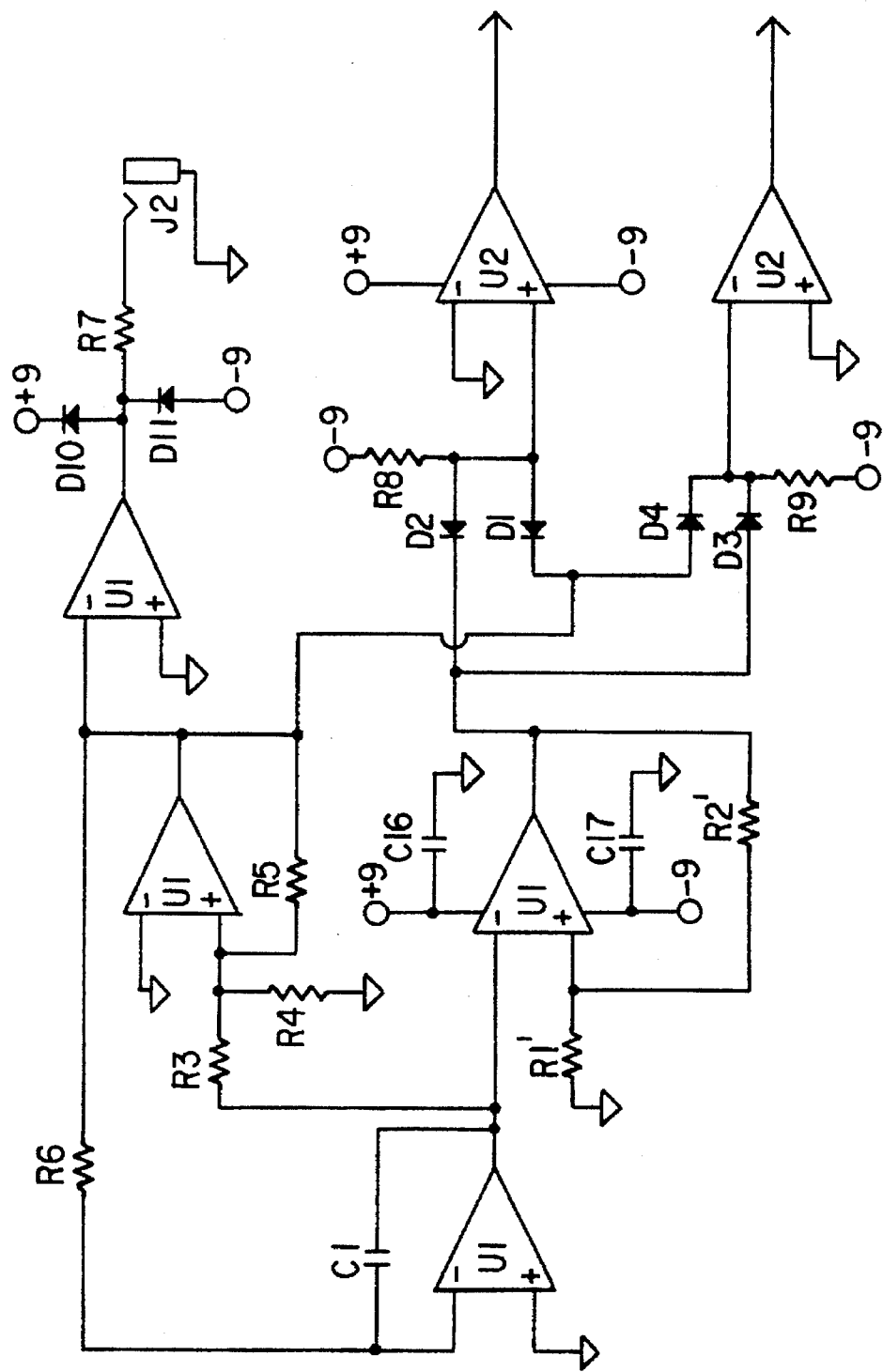
Figure 4B:
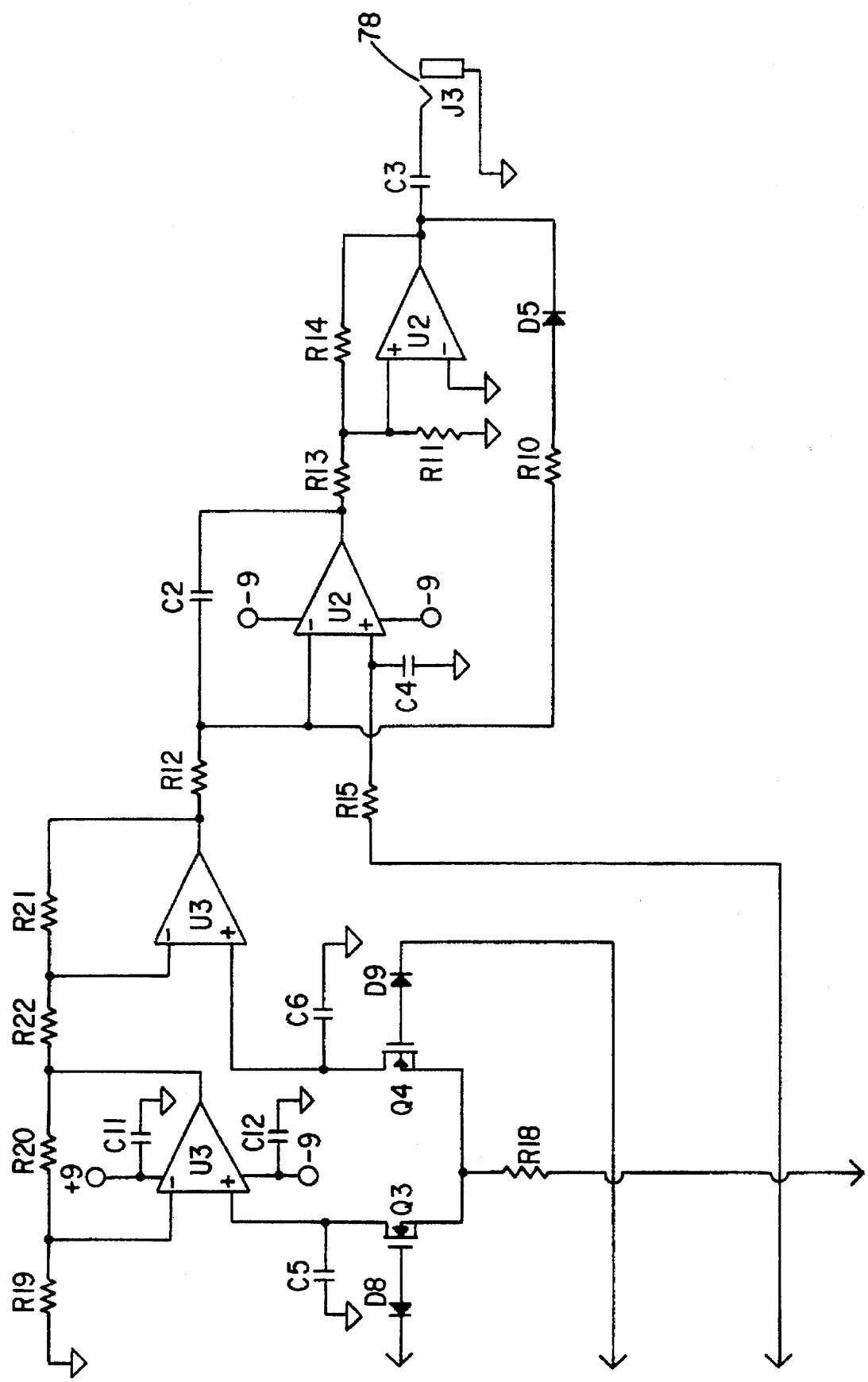
Figure 4C:
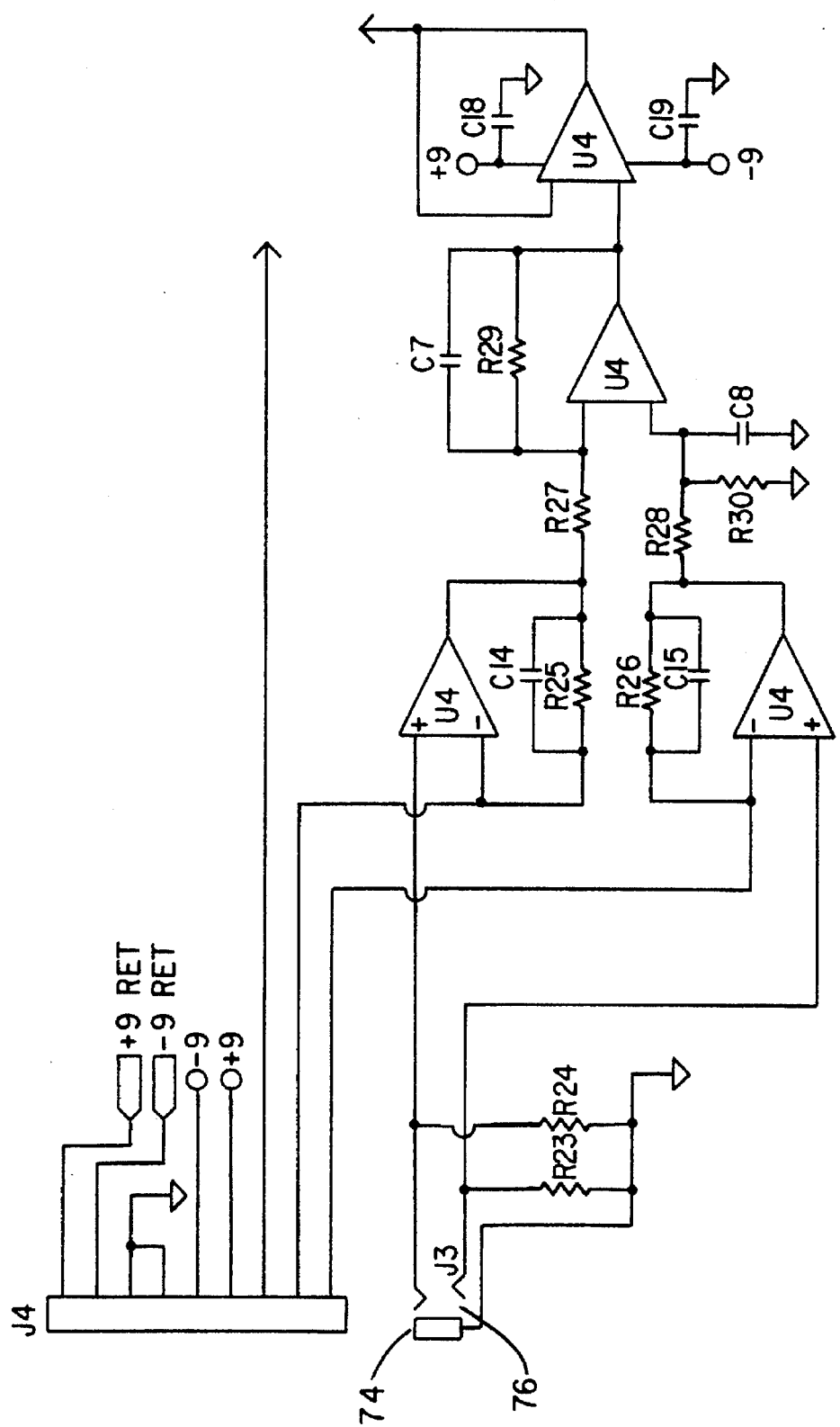

The changing voltage of the operational amplifier A3 is coupled to a voltage controlled oscillator (VCO) 86, constructed from the amplifier U2 at FIG. 4a. An increasing voltage at the output of A3, which is indicative of moving closer to a leak, induces an increased frequency at the oscillator 86 which, in turn, is converted to an audible frequency change that is sensed by the maintenance or operator personnel as an audible frequency change at the headset earphones 78. Probe movement is incrementally adjusted by the operator with the changing frequencies to locate each leak, which is indicated when the highest frequency is detected, before roll-off to a null condition or lower frequencies.

The removal of noise and common mode signals from the sensed differential signal at the amplifier A3 also advantageously produces a directionally sensitive signal. That is, upon moving the probe 70 past a leak, the output at the headset 78 becomes essentially nil. A sudden variation in intensity of the audio signal at the headset 78 thus indicates to the operator whether the probe movement is approaching or passing the leak.

Such directionality results from the positive correlation which occurs as the current signals are sensed by the probes 80, 82 as compared with the source generator signal. As the probe 70 approaches a leak a positive correlation exists which produces an output at A3. Upon passing a leak, a negative correlation exists. The source signal is no longer correlated to the sensed voltage at A2 and the resultant output at the amplifier A3 approaches zero to effectively turn the audio off.

Figure 8:
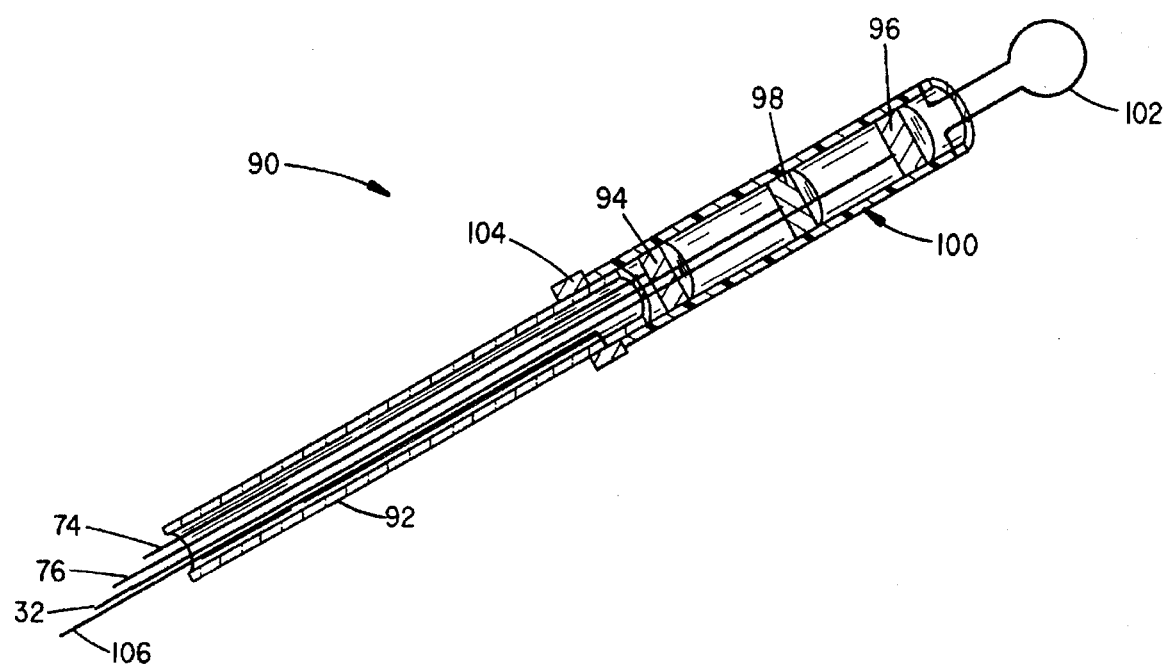
FIG. 8 is a cross section view through a flexible probe which includes a positional locator, and which supports a source signal electrode between the sensing electrodes.

If a leak is suspected in the supply and return conduits that communicate underground with the pool house 20, the conduits can be separately monitored with the flexible probe 90 of FIG. 8. The probe 90 includes the flexible conduit or guide 92 which couples the conductors 74, 76 and 32 to the sensor electrodes 94 and 96 and an intermediate source electrode 98 at a suitably shaped probe tip 100. The guide 92 must be sufficiently flexible that it can be snaked about the supply and return conduits.

Fitted to the tip 100 is a pull loop 102. The loop 102 can be mounted to a rope, line or other flexible member (not shown) that is conducted through the monitored conduit. If a leak is approached and passed by the probe 90, the polarity reversal in the sensed signals versus the frequency change in the open pool 4 identifies the leak location. The length of guide 92 inserted into the conduit can then be measured to determine the leak location. A radio frequency (RF) transmitter or RF antenna collar 104 that is coupled to a conductor 106 might also be coupled to the conduit 92 to faciltate finding the exact location with an above ground receiver or transmitter. A variety of other shallow earth locator appliances may also be fitted to the conduit 92 or probe tip 100 and be used to equal advantage.

While the invention has been described with respect to a presently preferred construction and various considered modifications and improvements, still other constructions may be suggested to those skilled in the art. All equivalent constructions should be interpreted within the spirit and scope of the appended claims.

What is claimed is:

1. Apparatus for locating a leak in a liquid impermeable membrane which impounds a quantity of a liquid, comprising:
   a) an anode submersed in a liquid contained by one surface of an elastomer membrane;
   b) a reference conductor mounted in the earth adjacent an opposite surface of said membrane;
   c) generator means coupled to said anode and said reference conductor for inducing source electrical gradients into said liquid, wherein an alternating signal is coupled to said liquid at a frequency in the range of 5 to 15 Hertz;
   d) probe means including a head containing first and second electrodes displaced from one another a fixed distance for monitoring said source electrical gradients established in said liquid; and
   e) processor means for synchronously sampling, integrating and comparing sampled sensed signals between said first and second electrodes and to sampled source signals and for indicating variations in a resultant signal, whereby common mode signals are rejected and a positive correlation is obtained between the sampled sensed and source signals.

2. Apparatus as set forth in claim 1 wherein said anode is mounted to a free floating support and wherein said alternating signal comprises a square wave signal.

3. Apparatus as set forth in claim 1 wherein said probe means comprises:
   a) a head comprising a hollow tube having a bore, wherein said first and second electrodes are mounted within said bore, and wherein said first and second electrodes are recessed from an exposed ends of said bore; and
   b) a pole and means for retaining said head to said pole.

4. Apparatus as set forth in claim 1 wherein said probe means comprises a head containing first and second electrodes and said anode, and wherein said first and second electrodes are mounted on opposite sides of said anode and including a flexible guide coupled to said head, whereby said head can be manipulated through a hollow conduit containing said liquid and coupled to said membrane.

5. Apparatus as set forth in claim 4 including means coupled to said head for pulling said head through said conduit and further including means communicating the physical location of said within said conduit.

6. Apparatus as set forth in claim 1 wherein said processor means comprises:
   a) means for amplifying signals sensed at said first and second electrodes;
   b) means for synchronously sampling said sensed signals and said source signal and for integrating the sampled sensed and source signals;
   c) means for subtracting the sampled sensed signal from the sampled source signals and amplifying a resultant signal; and
   d) means responsive to the resultant signal for producing a varying frequency indicative of the relative movement of said probe to a leak in said membrane.

7. Apparatus as set forth in claim 6 wherein a voltage controlled oscillator produces said varying frequency.

8. Apparatus as set forth in claim 1 wherein said membrane includes an electrical appliance exposed to said liquid and further including electrical insulator means for covering said appliance.

9. Apparatus as set forth in claim 8 wherein said insulator means includes means for covering said appliance and evacuating liquid adjacent said appliance to provide an insulative air space between said appliance and liquid.

10. Apparatus for locating a leak in a liquid impermeable membrane which impounds a quantity of a liquid, comprising:
    a) an anode mounted to a free floating support and submersed in a liquid contained by one surface of an elastomer membrane;
    b) a reference conductor mounted in the earth adjacent an opposite surface of said membrane;
    c) generator means coupled to said anode and said reference conductor for inducing source electrical gradients in said liquid, wherein a square wave source signal is coupled to said liquid at a frequency in the range of 5 to 15 Hertz;
    d) probe means including a head containing first and second electrodes displaced from one another a fixed distance and wherein said head is supported to a pole for monitoring said source electrical gradients established in said liquid;
    e) processor means for producing an audio signal indicative of a leak comprising;
       i) a first operational amplifier coupled to the sensed signals of said first and second electrodes;
       ii) switch means for synchronously sampling said sensed signals with said source signal;
       iii) means for integrating the sampled sensed and source signals;
       iv) a second operational amplifier for comparing and amplifying the integrated sensed and source signals; and
       v) a voltage controlled oscillator responsive to a resultant signal for producing a varying frequency indicative of the relative movement of said probe to a hole in said membrane; and
    f) speaker means for annunciating an audible indication of movement of said probe.

11. Apparatus as set forth in claim 10 wherein said membrane includes an electrical appliance exposed to said liquid and further including means for covering said appliance and evacuating liquid adjacent said appliance to provide an insulative air space between said appliance and liquid.

12. Apparatus for locating a leak in a liquid impermeable membrane which impounds a quantity of a liquid and wherein said membrane includes an electrical appliance exposed to said liquid, comprising:
    a) an anode mounted to a free floating support and submersed in a liquid contained by one surface of an elastomer membrane;
    b) a reference conductor mounted in the earth adjacent an opposite surface of said membrane;
    c) means for covering said appliance and evacuating liquid adjacent said appliance to provide an insulative air space between said appliance and liquid;
    d) generator means coupled to said anode and said reference conductor for inducing alternating source electrical gradients in said liquid in the range of 5 to 15 Hertz;
    e) probe means for monitoring said source electrical gradients established in said liquid and producing a sensed signal; and
    f) processor means for synchronously sampling said sensed and source signals and for integrating and comparing the sensed and source signals and for indicating variations in a resultant signal.

13. A method for locating a leak in a liquid impermeable membrane impounding a quantity of a liquid, comprising:

a) submersing an anode in a liquid contained by one surface of an elastomer membrane;

b) mounting a reference conductor in the earth adjacent an opposite surface of said membrane;

c) coupling an alternating source signal to said liquid;

d) manipulating a probe means including a head containing first and second electrodes displaced from one another a fixed distance to monitor said source electrical gradients established in said liquid;

e) coupling signals sensed by said first and second electrodes to a first operational amplifier;

f) synchronously sampling said sensed signals with said source signal;

g) integrating the sampled sensed and source signals;

h) comparing the sampled sensed and source signals at a second operational amplifier; and h) coupling a resultant signal of said second operational amplifier to a voltage controlled oscillator responsive to produce a varying frequency indicative of the relative movement of said probe to a hole in said membrane; and f) audibly annunciating the varying frequency at a speaker.

14. A method as set forth in claim 13 wherein said anode is supported to a free floating support.

15. A method as set forth in claim 13 wherein said anode is supported between said first and second electrodes and wherein said probe is coupled to a flexible guide which can be manipulated in conduits coupled to said membrane.

16. A method as set forth in claim 13 wherein said membrane includes an electrical appliance exposed to said liquid and further including covering said appliance with an electrically insulative cover.

17. A method as set forth in claim 16 including evacuating liquid trapped between said appliance and cover to provide an insulative air space.

18. A method as set forth in claim 13 wherein a source square wave signal is coupled to said liquid at a frequency in the range of 5 to 15 Hertz.

* * * * *